April 10, 1956  B. COOPER  2,741,433
TOLL CHECKING SYSTEM
Filed May 17, 1952
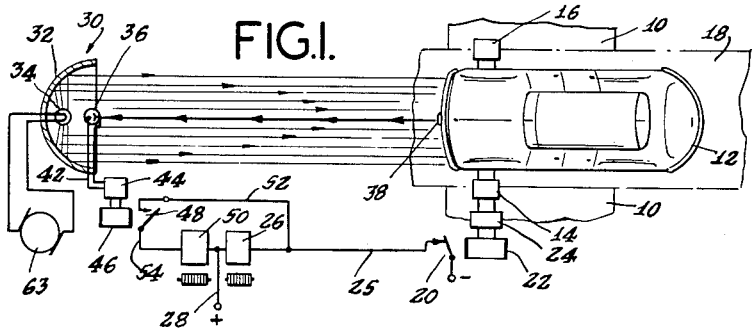
FIG.I.
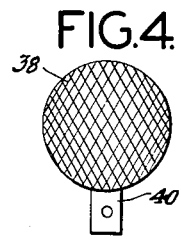
FIG.4.
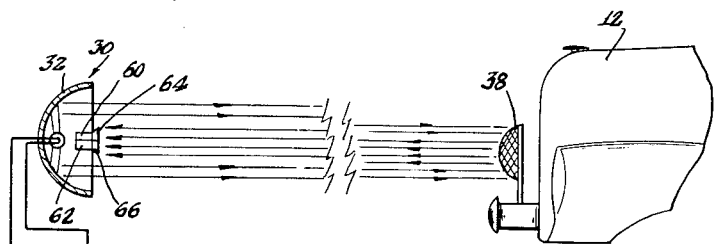
FIG.2.
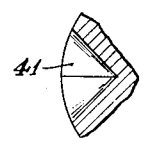
FIG.5.
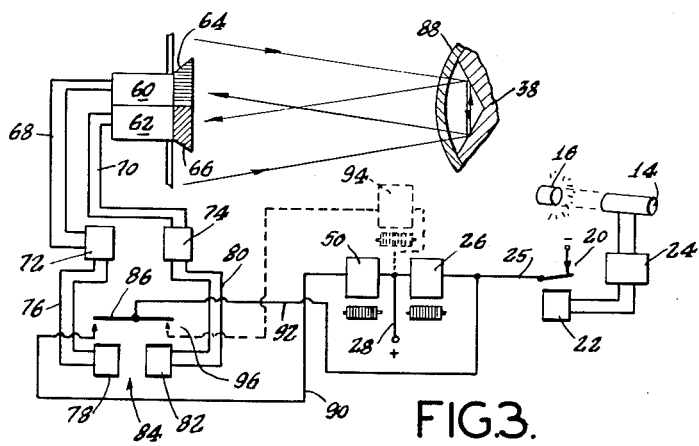
FIG.3.
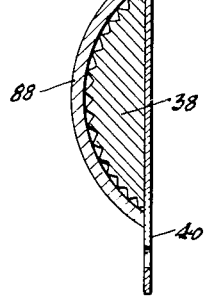
FIG.6.
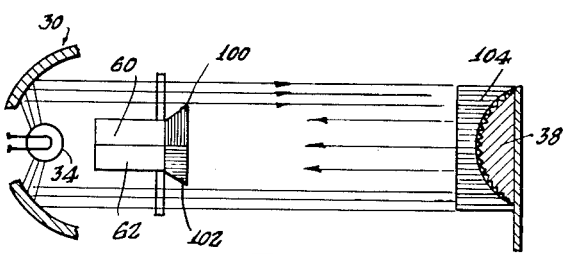
FIG.8.
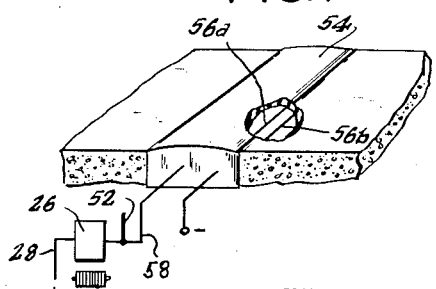
FIG.7.
INVENTOR.
BENJAMIN COOPER
BY
*J. B. Felshin*
ATTORNEY.

United States Patent Office 2,741,433
Patented Apr. 10, 1956

2,741,433

TOLL CHECKING SYSTEM

Benjamin Cooper, New York, N. Y.

Application May 17, 1952, Serial No. 288,575

13 Claims. (Cl. 235—92)

This invention relates generally to vehicular traffic counting systems of the type wherein treadle switches or photo-electric means are disposed on a roadway for actuation by traversing vehicles. In particular, the present invention is directed toward means for differentiating between classes of vehicles traversing said roadway counting means.

Essentially, the present invention comprises, a detector that is sensitive to vehicle carried means and responds thereto in such a manner that the normally present counting means is effected to make a count distinct from the counts of vehicles not carrying said aforesaid means.

It is proposed that the present invention be incorporated into a toll checking system as a means for differentiating between the count of revenue paying vehicles and the count of non-revenue paying vehicles. In systems employing treadle actuated counters to count the axles of vehicles passing through a toll facility, a general total count results. Thus, non-revenue paying vehicles such as those driven by officials, employees, police, etc. are included in the total count preventing an accurate verification of the toll revenue turned in by the toll collectors.

The present invention provides automatic counting means, operable independently of the toll collector, that separately counts those vehicles permitted to use the toll facility free of charge. Accordingly, an accurate count of revenue-paying vehicles is readily maintained.

One of the principal objects of the invention resides in the provision of a vehicle counting system having means to differentiate between differing classifications of vehicles.

Another object of the invention is to provide in a vehicle counting system, plural counters and means to control the respective counters to count differing classifications of vehicles.

Another object of the invention is to provide means carried by certain vehicles to actuate said counter controlling means.

A further object is to provide means that limits actuating control of the counter controlling means, to a specific vehicle-carried means.

Other ancillary objects will be in part, hereinafter pointed out, and in part hereinafter apparent.

In the drawings:

Fig. 1 is a schematic diagram of a counting circuit utilizing the present invention, wherein photo-electric cell-controlled counters are used to selectively record the passage of vehicles through a toll installation.

Figure 2 is a schematic diagram illustrating in detail the reflecting principle of the present invention.

Figure 3 is a schematic diagram of the invention illustrating another embodiment of the control circuits for operating the counters particularly illustrating a differential relay that is controlled by a pair of polarized photocells.

Figure 4 is a front view of the reflecting elements.

Figure 5 is an enlarged detail illustrating one of the plurality of hollow polyhedron shaped reflecting surfaces.

Figure 6 is a cross section of the reflecting element illustrating a filter element thereon.

Figure 7 is a schematic diagram of a counting circuit illustrating in perspective view a treadle for actuating the counting circuit.

Figure 8 is a view taken in cross section through the various elements of the invention particularly illustrating the polarized relationship therebetween.

Referring to the drawings in detail, 10 designates a lane defining structure such as a toll booth or the like, wherein vehicles 12 are required to pay a toll before passing therethrough. As shown in Fig. 1, a photo-electric cell 14 is arranged to receive the light from a light source 16 disposed oppositely of the vehicular lane 18. Photo-electric cells are well known in the art as being capable of generating electrical currents when exposed to a beam of light. Interruption of said beam of light results in the degeneration of the photo-electric cell electrical current and a switch is controlled accordingly. Such a switch may be used to actuate a counter or the like to record the number of interruptions of the beam of light.

Fig. 1 illustrates a system utilizing this conventional counting method wherein a normally open switch 20 is permitted to close when the light source 16 is interrupted by a vehicle 12. Switch 20 is controlled by a relay 22 connected to the output of an amplifier 24. Such an amplifier is conventional and well known to those skilled in the art. In accordance with basic electrical principles, amplifier 24 amplifies the minute electrical currents generated by photo-electric cells 14 to control relay 22 accordingly. Switch 20 has one contact connected to a negative source of potential and has the other contact thereof connected by a conductor 25 to one terminal of an electromagnetic counter 26. The other terminal of counter 26 is connected by conductor 28 to a source of positive potential. Interruption of light source 16 de-energizes relay 22 thereby closing switch 20. The closure of switch 20 energizes counter 26 to advance its unit wheel one increment.

Counter 26 is of the conventional electro-magnet type provided with a suitable count capacity wherein a coil is energized to actuate an armature. The armature movement advances the unit counting wheel one digit. Transfer means couple said unit wheel to a tens digit wheel, etc. in a well known manner. Such a counter is completely disclosed in the patent to Cooper No. 2,293,934, issued August 25, 1942, and need not be described in detail herein.

The present invention appertains to auxiliary means utilized in combination with the aforesaid vehicle counter to differentiate between at least two general vehicle classifications such as toll paying and non-toll paying vehicles, respectively.

In the preferred embodiment of the invention there is provided a lamp 30 comprising a parabolic reflector 32 having an incandescent bulb 34 centrally disposed therein. Bulb 34 is mounted in spaced relation to the reflector 32 so that light emitted therefrom is reflected at an angle of substantially ninety degrees which focuses the substantially parallel rays of a relatively narrow beam of light on a predetermined area. As shown in Fig. 1, lamp 30 is arranged to be mounted in an elevated location, such as on a canopy or the like and directed downwardly to project a beam of light on the area of roadway between photo-cell 14 and its light source 16. Thus, the front portion of vehicle 12 will receive thereon, the beam of light from lamp 30 at substantially the same instant that said vehicle interrupts the photo-cell light source 16.

Mounted within reflector 32 of lamp 30 is a photo-cell 36 that is directed to receive light from a direction opposite to that of the beam of light of lamp 30; i. e., light emitted from lamp 30 will not directly actuate photo-cell 36 but if reflected by means, hereinafter described, the light from lamp 30 will strike the light-sensitive surface of photo-cell 36 to actuate said photo-cell. Photo-cell 36 is small relative to the reflecting area of reflection 30 and does not interfere with the light projected therefrom.

The returning of light rays to photo-cell 36 requires means having a multitude of reflective angles in order to compensate for the variable positioning of vehicles traversing the toll facility. To this end, there is provided a reflector unit 38 having suitable attaching means 40 for the mounting thereof on a vehicle, preferably on the front license or registration plate. The convex periphery, Figs. 4, 5 and 6 of unit 38, comprises a plurality of recesses 42, each formed with the shape of a hollow polyhedron wherein each equiangular planar surface reflects light directed thereon at an angle of ninety degrees onto its opposite planar surface which in turn reflects the light at a second ninety degree angle. Thus, the original light wave is reflected back one hundred and eighty degrees in the direction from which it originated. Further, the four reflecting surfaces of each polyhedron provides many opportunities for the beam of light emitted from lamp 30 to be reflected back onto the light sensitive surface of photo-cell 36.

Accordingly, reflector unit 38, if discriminately mounted on vehicle 12, will actuate photo-cell 36 concurrently with the de-actuation of photo-cell 16.

Photo-cell 36 is connected by suitable conductors 42 to an amplifier 44, shown in block form in Fig. 1, which in turn controls a relay 46. Amplifier 44 is of the conventional voltage amplifying type wherein an output circuit is controlled in accordance with the input signal and is known to those skilled in the art and need not be described in detail. It is deemed sufficient to state that light upon striking the light-sensitive photo-cell 36 results in the energization of relay 46. Normally open switch 48 associated with relay 46 closes upon the energizing of said relay and completes a circuit to counter 50. This circuit may be traced as follows: From the negative source of potential through closed switch 20, over conductor 52, through closed switch 48, and over conductor 54 to one terminal of the coil of electromagnetic counter 50. The other terminal of the coil of counter 50 is connected by conductor 28 to the source of positive potential. The energizing of counter 50 effects the advancement of the unit digit wheel associated therewith, one increment.

Thus, interruption of light source 16 by vehicle 12, actuates counter 26 to record the passage of a vehicle irrespective of classification and the concurrent actuation of photo-cell 36 by reflected light from the vehicle-carried reflector unit 38 actuates counter 50 to record the passage of a specially classified vehicle. Obviously, counter 50 will not be actuated unless the passing vehicle carries a reflector unit 38, nor will said counter be actuated if relay 22 is not actuated.

Referring to Fig. 7, there is shown a treadle 54 having two normally open contacts 56a and 56b which are connected respectively to a source of negative potential and to a conductor 58, said conductor to which is connected to one terminal of the coil of counter 26 while the other terminal is connected by conductor 28 to the source of positive potential. The weight of a vehicle rolling over treadle 54 effects the closure of contacts 56a and 56b to energize counter 26 and record a count thereon. Treadle 54 may be readily substituted for photo-cell 14 without departing from the scope of the present invention. In such an event, relay 22 would be deleted.

Another embodiment of this invention is illustrated in Figs. 2 and 3, wherein lamp 30 supports a pair of photo-cells 60 and 62 in adjacent relation.

In an analogous manner to that previously described, reflector 32 projects substantially parallel rays of light from bulb 34 on a predetermined area of roadway. Bulb 34 is excited by a source of alternating current designated as 63 and illustrated in schematic form as an alternating generator. It is proposed that generator 64 have a cyclic output that differs from the normal sixty-cycle illuminating alternating current, for reasons hereinafter appearing. To avoid reflecting the light emitted from lamp 30 by extraneous reflecting surfaces, such as the chrome trim on a vehicle, each of the photo-cells 60, 62 is provided with a different color filter. As an example, photo-cell 60 may be covered with a blue filter 64 while photo-cell 62 may be covered with a red filter 66. Each of the photo-cells 60—62 is connected by conductors 68 and 70, respectively to amplifiers 72 and 74, respectively.

The output of amplifier 72 is connected by conductors 76 to the respective terminals of coil 78. Conversely the output of amplifier 74 is connected by conductors 80 to the respective terminals of coil 82. Coils 78 and 82 are part of a differential relay 84 having a common armature 86 centrally pivoted to respond directionally according to which one of the coils 78 or 82 is energized.

Further, vehicle-carried reflector unit 38 is provided with a colored filter 88 which covers the reflective periphery thereof. The filter 88 is designed to pass light corresponding to that passed by filter 64. In the example hereinbefore set forth, filter 64 is adapted to pass only the blue color of the spectrum. Therefore, of the white light emitted by lamp 30, only the blue portion thereof would be reflected back to the photo-cells 60—62. Photo-cell 60 would receive the blue portion through filter 64 and be actuated thereby. Accordingly, coil 78 of differential relay 84 will be energized.

Photo-cell 62 will not receive any substantial light through its differently colored filter and effectively does not energize coil 82. Switch 90 closes upon the energization of coil 78 and completes a circuit through conductors 90 and 92 to counter 50 to actuate said counter in the manner hereinbefore described.

To avoid accidental operation of counter 50 by an extraneous source of blue light, the amplifier 72 may be provided with a resonant circuit tuned to the frequency of the alternating generators 63. Thus, only light having the same frequency as that of lamp 30 reflected by a reflector unit 38 would produce a count on counter 50.

It will be noted that a further circuit could be provided to control a third counter 94, shown in dotted line, Fig. 3, and connected by suitable conductors to the source of potential through a switch 96. Switch 96 would be closed upon the energization of coil 82 of differential relay 84. To record a count on counter 94, reflector unit 38 would be provided with a filter similar to that covering the photo-cell 62. Therefore, certain vehicles could be equipped with filters of a predetermined color passing ability on reflector units 38 to actuate photo-cell 60 or could be provided with a different color filter to actuate photo-cell 62.

A further embodiment of the invention is illustrated in Fig. 8 wherein polarized light filters 100 and 102 are provided. Filter 100 is polarized to pass vertically polarized light while filter 102 is adapted to pass horizontally polarized light. Thus, stray or extraneously reflected light will contain equal quantities of vertically and horizontally polarized rays which will produce a balanced condition. Utilizing the same circuits of the embodiment shown in Fig. 2, differential relay 84 will not actuate armature 86 since both coils 78, 82 are equally energized. As hereinbefore described, coils 78 and 82 have a common armature that is centrally pivoted therebetween. Thus, energization of one of the coils results in the attraction of the armature 86 thereto and the associated switch is closed thereby. The opposite side of the armature is concurrently pivoted away from the other coil and the related switch does not close. When both coils 78 and 82 are energized, the armature 86 is attracted equally thereto and since this armature is centrally pivoted, the equal magnetic attraction is balanced and the armature does not move. Coils 78 and 82 when independently energized will attract the armature 86 in the related direction and will close the switch that is associated with the particular coil that is energized. However, the provision of a polarized filter on the reflector unit 38 will cause the reflection of either horizontal or vertical rays of light onto the photo-cells 60 and 62. This produces an unbalanced circuit condition and effectively actuates the counter controlling switch to register a classification count. Filter 104, as shown, will pass horizontal waves of light which are reflected back to photo-cells 60 and 62. Photo-cell 62 will be actuated since the filter 102 associated therewith will only pass the reflected horizontal waves. Photo-cell 60 will not be actuated as a result of filter 100 blocking said reflected horizontal waves of light.

What is claimed is:

1. In combination, a pair of counters, vehicle actuated means to actuate one of said counters, means to actuate the other of said pair of counters, vehicle carried means, means controlled by said vehicle carried means to actuate said other counter actuating means upon a vehicle having said vehicle carried means thereon concurrently actuating said first counter actuating means.

2. In combination, a pair of counters, a treadle disposed transversely of a vehicular roadway, one of said counters being actuatable each time the wheels of a vehicle roll over said treadle, means to actuate the other of said counters, vehicle carried means, means controlled by said vehicle carried means to actuate said other counter actuating means, and said other counter actuating means being actuatable only upon a vehicle having said vehicle carried means thereon rolling over said treadle and actuating the first counter.

3. In combination, a counter, means to actuate said counter, means carried by a vehicle, means controlled by the vehicle carried means to preset said counter actuating means, a second counter, a treadle, treadle controlled means to actuate said second counter when the wheels of a vehicle roll over the treadle, and means for preventing actuation of the first counter until said treadle is actuated.

4. In combination, a first and a second counter, a treadle disposed transversely of a vehicular roadway, said first counter being actuatable each time the wheels of a vehicle roll over said treadle, means to actuate said second counter, vehicle carried means, means controlled by said vehicle carried means for actuating said second counter actuating means to actuate said second counter, and said second counter being operable only when said treadle is actuated.

5. In combination, a pair of counters, vehicle sensing means arranged to sense the passage of a vehicle to actuate one of said counters, a light source arranged to project a beam of light, reflecting means carried by a vehicle for reflecting said beam of light, photo-electric means arranged to receive the beam of light reflected by said reflecting means, means controlled by said photo-electric means to control the actuation of the other of said counters and means responsive to the actuation of said sensing means to actuate the other of said counters.

6. In a vehicle counting system, in combination, a counter, means to actuate said counter each time a vehicle passes said means, a second counter, normally inoperative photo-electric means, a light source, vehicle carried means arranged to reflect light from said light source on to said photo-electric means to make said photo-electric means operative, and means actuatable by said operative photo-electric means to actuate said second counter upon actuation of said first counter actuating means.

7. In a vehicle counting system, a counter, means to actuate the counter each time a vehicle passes said means, a second counter, means to actuate said second counter, signalling means, vehicle carried means for reflecting signals from said signalling means, means responsive to the signals reflected by said vehicle carried means to actuate said second counter actuating means, and means to prevent actuation of said second counter until said first counter actuating means is actuated.

8. In a vehicle counting system, in combination, a counter, means to actuate said counter each time a vehicle passes said means, a second counter, a light source, a pair of photoelectric cells, vehicle carried means arranged to reflect light from said light source on to said photo-electric cells, differing colored filters covering the respective photo-cells, a filter covering said vehicle carried means having the same color filtering characteristics as one of said photo-electric cells filters, a differential relay having a pair of coils, each of which are energized by a respective photo-electric cell, and switch means controlled by the unbalancing of said differential relay to actuate said second counter upon actuation of said first counter actuating means.

9. In a vehicle counting system, in combination, a counter, means to actuate said counter each time a vehicle passes said means, a second counter, a light source, a pair of photo-electric cells, vehicle carried means arranged to reflect light from said light source onto said photo-electric cells, polarized filters covering the respective photo-cells, each being polarized in differing relation, a polarized filter covering said vehicle carried means having the same polarization as one of said photo-electric cell polarized filters, a differential relay having a pair of coils, each of which are energized by a respective photo-electric cell, and switch means controlled by the unbalancing of said differential relay to actuate said second counter upon actuation of said first counter actuating means.

10. In combination, a pair of counters, means to actuate only one of said counters when any vehicle passes a predetermined point in a road, vehicle carried means, means controlled by said vehicle carried means to actuate the other counter when any vehicle carrying said vehicle carried means passes said point in the road and said first counter actuating means is actuated.

11. In combination, a pair of counters, means to actuate only one of said counters when any vehicle passes a predetermined point in the road, vehicle carried means, and means controlled by said vehicle carried means to additionally actuate the other counter so that both counters are actuated when any vehicle carrying said vehicle carried means passes said point in the road, said second counter being actuatable only upon the actuation of the first counter.

12. In combination, a counter, means to actuate said counter, signalling means, receiver means to control actuation of said counter actuating means upon receiving a signal from said signalling means, vehicle carried means for causing signals from the signalling means to reach said receiving means, a second counter, vehicle controlling means to actuate said second counter, and means to prevent actuation of the first counter unless the second counter is simultaneously actuated.

13. In combination, a pair of counters, vehicle sensing means arranged to sense the passage of a vehicle to actuate one of said counters, a light source arranged to project a beam of light, reflecting means carried by a vehicle for reflecting said beam of light, photo-electric means arranged to receive the beam of light reflected by said reflecting means, means controlled by said photo-electric means to actuate the other of said counters, and means to prevent actuation of said second counter unless said first counter is also actuated.

References Cited in the file of this patent

UNITED STATES PATENTS

| | | |
|---|---|---|
| 1,982,341 | Hitchcock | Nov. 27, 1934 |
| 2,293,933 | Cooper | Aug. 25, 1942 |
| 2,319,153 | Nolde | May 11, 1943 |